(12) United States Patent
Masuda

(10) Patent No.: US 9,069,108 B2
(45) Date of Patent: Jun. 30, 2015

(54) BACKLIGHT UNIT AND LIQUID CRYSTAL DISPLAY DEVICE

(71) Applicant: Sharp Kabushiki Kaisha, Osaka-shi, Osaka (JP)

(72) Inventor: Junichi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/365,694

(22) PCT Filed: Feb. 20, 2013

(86) PCT No.: PCT/JP2013/054143
§ 371 (c)(1),
(2) Date: Jun. 16, 2014

(87) PCT Pub. No.: WO2013/125567
PCT Pub. Date: Aug. 29, 2013

(65) Prior Publication Data
US 2014/0362604 A1  Dec. 11, 2014

(30) Foreign Application Priority Data

Feb. 24, 2012 (JP) ................................. 2012-039184

(51) Int. Cl.
*F21V 7/04* (2006.01)
*F21V 8/00* (2006.01)

(52) U.S. Cl.
CPC ............ *G02B 6/0038* (2013.01); *G02B 6/0055* (2013.01); *G02B 6/0088* (2013.01)

(58) Field of Classification Search
CPC ... G02B 6/0038; G02B 6/0088; G02B 6/0055
See application file for complete search history.

(56) References Cited

U.S. PATENT DOCUMENTS

2011/0109843 A1   5/2011   Jung

FOREIGN PATENT DOCUMENTS

JP   2011-100728 A   5/2011

OTHER PUBLICATIONS

Official Communication issued in International Patent Application No. PCT/JP2013/054143, mailed on Apr. 9, 2013.

*Primary Examiner* — Joseph L Williams
(74) *Attorney, Agent, or Firm* — Keating & Bennett, LLP

(57) ABSTRACT

In order to suppress uneven brilliance of emitted planar light and enhance a rate of light utilization, the present invention provides a backlight unit (1) including: a light guide plate (2) receiving from a light source (31) from a light receiving surface (22) on a side surface and emitting planar light from a light emitting surface on a front surface; and a front side pressing member (5) having a light guide plate pressing portion (52) to press a peripheral portion on the front surface of the light guide plate (2); wherein an attached shape (211) in a concave and convex pattern shape is formed in the light emitting surface (21), and the light guide plate pressing portion (52) is provided with an engagement portion (521) provided with a concave and convex pattern that is engageable with a attached shape (211).

9 Claims, 9 Drawing Sheets

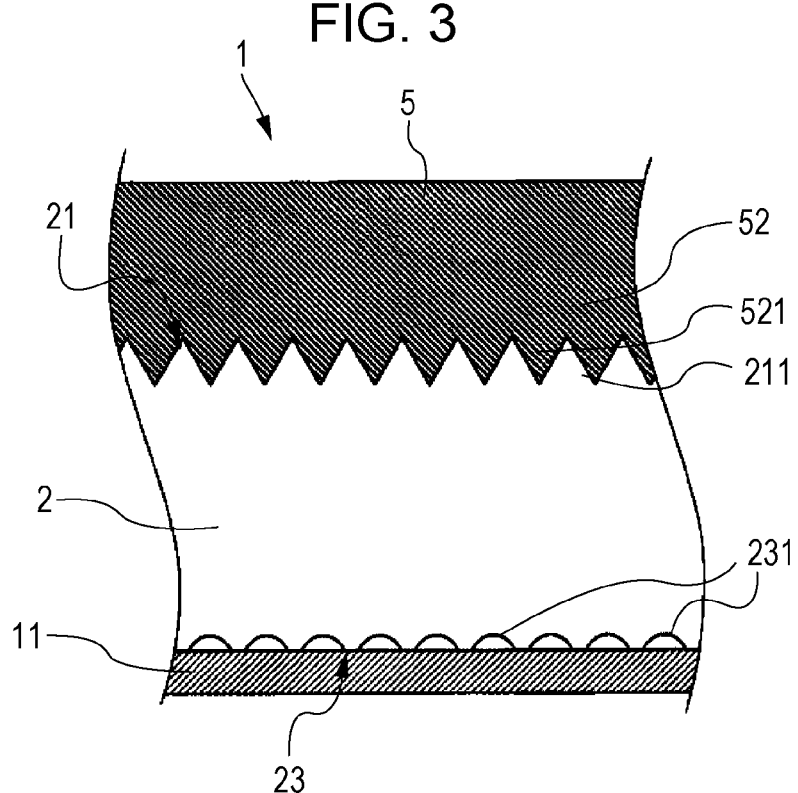
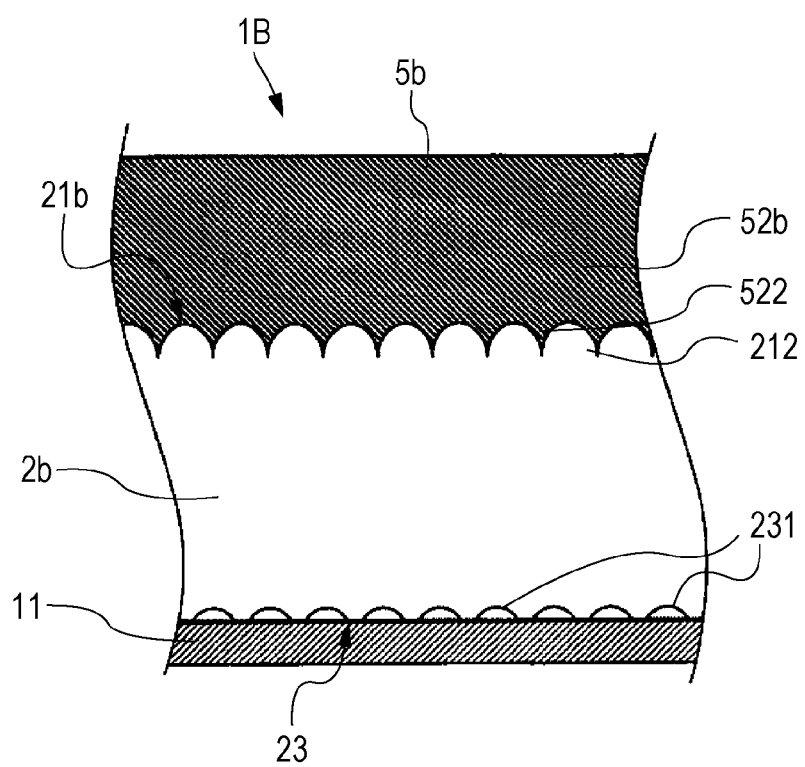

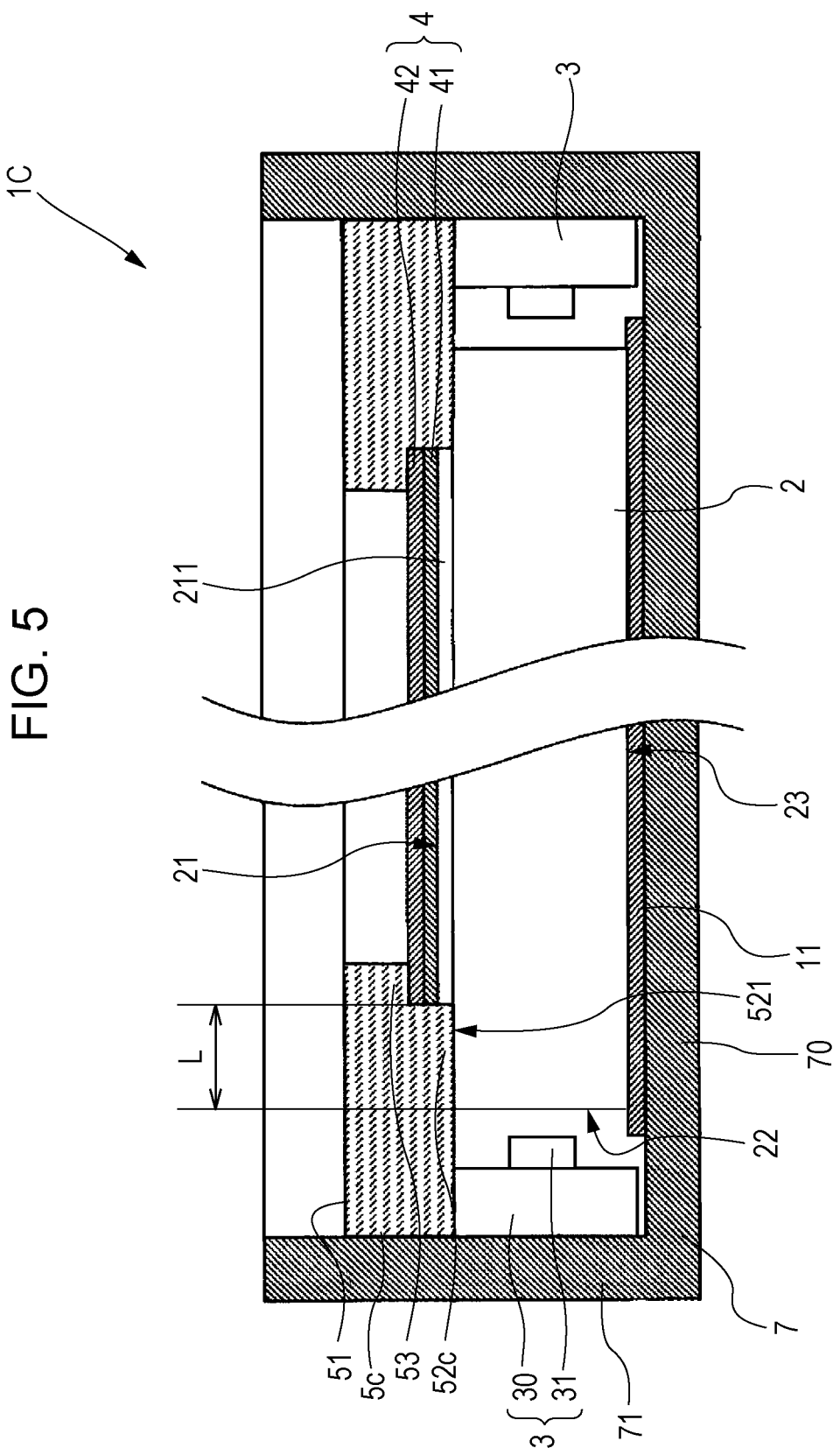

BACKLIGHT UNIT AND LIQUID CRYSTAL DISPLAY DEVICE

TECHNICAL FIELD

The present invention relates to a liquid crystal display device and to a backlight unit used for a liquid crystal display device.

BACKGROUND ART

A liquid crystal display device is provided with a liquid crystal panel unit and a backlight unit disposed on a back surface of the liquid crystal panel unit, and the liquid crystal panel unit adjusts transmittance (amount of transmission) of light from the backlight unit to display an image on a front surface of the liquid crystal panel unit.

The backlight units are roughly classified into two systems. One is a light guide plate system (edge light system) to introduce light from a side surface of a light guide plate, and the other is a direct type system to have a light source on a back surface of a liquid crystal module.

Descriptions are given below to a liquid crystal display device provided with a backlight unit of the edge light system. FIG. 9 is a cross-sectional view of a liquid crystal display device using a backlight unit of a conventional edge light system, and FIG. 10 is an X-X line cross-sectional view of the backlight unit in FIG. 9. As illustrated in FIG. 9, a backlight unit 91 of the edge light system is provided with light source units 93 having a plurality of light sources (LEDs) side by side disposed therein, a light guide plate 92 to receive light emitted from the light source units 93 from light receiving surfaces 922 on side surfaces and to emit planar light from a light emitting surface 921 of one of the main surfaces, an optical sheet 94 disposed adjacent to the light emitting surface 921 of the light guide plate 92. Then, these members are disposed inside housing 97.

As illustrated in FIG. 9, in a liquid crystal display device, a front side pressing member 95 is disposed so as to press front side peripheral portions of the light guide plate 92 and the optical sheet 94 and a liquid crystal panel unit 96 is disposed on a front side of the front side pressing member 95. The planar light emitted from the light emitting surface 921 of the light guide plate 92 is introduced to the liquid crystal panel unit 96, and the liquid crystal panel unit 96 forms a picture by modulating the planar light.

As described above, since an image is formed by modulating planar light in a liquid crystal display device, quality of the image is higher as brilliance of the planar light is higher and uniformity of the brilliance is higher. The light introduced from the light receiving surface 922 is introduced at a large angle of incidence to the light emitting surface 921. When the angle of incidence to the light emitting surface 921 is more than a critical angle, the light is totally reflected on the light emitting surface 921 and the light does not easily emit from the light emitting surface 921, which causes uneven brilliance of the planar light. Therefore, among liquid crystal display devices, those having a concave and convex shape formed in the light emitting surface 921 of the light guide plate 92 are proposed to suppress the uneven brilliance of the planar light and to improve the brilliance on the front side (for example, refer to Japanese Unexamined Patent Application Publication No. 2011-100728 and the like).

In the light guide plate 92, usually, a rising portion is formed on a reflection surface 923 to direct a direction of travel of light inside the light guide plate 92 towards the light emitting surface 921. In the light guide plate 92, by adjusting a shape and (or) density of the rising portion, the brilliance of light towards the light emitting surface 921 is uniformized. A concave and convex shape 924 formed in the light emitting surface 921 acts as a prism, and light transmitting through the concave and convex shape 924 is collected towards the front. This enhances the brilliance of light emitted from the light emitting surface 921.

CITATION LIST

Patent Literature

PTL 1: Japanese Unexamined Patent Application Publication No. 2011-100728

SUMMARY OF INVENTION

Technical Problem

In the backlight unit 91, the front side pressing member 95 makes contact with the peripheral portions of the light emitting surface 921 of the light guide plate 92. Since the concave and convex shape 924 is formed in the light emitting surface 921 of the light guide plate 92, gaps are formed between contact portions of the light emitting surface 921 and the front side pressing member 95 (refer to FIG. 10). The contact portions between the concave and convex shape 924 and the optical sheet 94 are also formed near the light source units 93, and out of the light emitted from the light sources of the light source units 93, a part of light not introduced inside the light guide plate 92 from the light receiving surfaces 922 leaks through the gaps.

There is a case that a part of the light leaking through the gaps (leakage light) passes through the gaps between the front side pressing member 95 and the optical sheet 94, that is, to be introduced to the liquid crystal panel unit 96 without passing through the optical sheet 94. Although the planar light emitted from the light emitting surface 921 is uniformized by passing through the optical sheet 94 in the backlight unit 91, when there is light not passing through the optical sheet 94 like the leakage light described above, the brilliance is not uniformized and uneven brilliance occurs to reduce the quality of the planar light. In addition, although there is also a backlight unit provided with a light absorbing portion to absorb the leakage light, the light is absorbed so that the rate of light utilization decreases.

With that, it is an object of the present invention to provide a backlight unit that is capable of suppressing the uneven brilliance of planar light to be emitted and also of enhancing the rate of light utilization and a liquid crystal display device using the backlight unit.

Solution to Problem

In order to achieve the above objects, the present invention provides a backlight unit including: a light guide plate receiving light from a light source from a light receiving surface on a side surface and emitting planar light from a light emitting surface on a front side; and a front side pressing member having a light guide plate pressing portion to press a peripheral portion on the front side of the light guide plate, wherein an attached shape in a concave and convex pattern shape is formed in the light emitting surface of the light guide plate, and the light guide plate pressing portion is provided with an engagement portion provided with a concave and convex pattern that is engageable with the attached shape.

According to this configuration, by providing an engagement portion to engage with an attached shape formed on a light emitting surface of the light guide plate in a light guide plate pressing portion of a front side pressing member, a gap between the attached shape and the light guide plate pressing portion is eliminated and occurrence of leakage light passing through the gap is suppressed.

In this way, it is possible to suppress so-called uneven brilliance in which portions of high (or low) brilliance occur in a part of the planar light and it is possible to suppress reduction in quality of the planar light.

In the above configuration, the attached shape has a shape in which a convex strip and a concave groove extending in a direction crossing the light receiving surface are arranged alternately in a direction along the light receiving surface, and the light guide plate pressing portion is provided with the engagement portion at least in a portion making contact with a region next to the light receiving surface of the light emitting surface.

Since the attached shape is in a shape in which a convex strip and a concave groove are arranged in a direction along a light receiving surface, a gap between the attached shape and the light guide plate pressing portion is formed near a light receiving surface. Therefore, by forming the engagement portion at least in a portion making contact with a region near the light receiving surface, it is possible to suppress light from the light source going through the gap to become leakage light.

In the above configuration, the convex strip of the attached shape may be in a triangular prism shape and the attached shape may also be in a lenticular shape.

In the above configuration, the engagement portion has a convex portion that engages with the concave groove of the attached shape projecting from the light guide plate pressing portion, and the convex portion is capable of elastic deformation.

According to this configuration, even when variation occurs in a shape of the attached shape or a part of the attached shape is provided in a different shape, the convex portion makes tight contact with the concave groove, so that it is possible to suppress occurrence of the leakage light. Even when using a light guide plate having an attached shape in a different shape depending on a model type of the backlight unit, it is possible to use a common front side pressing member, and it is possible to reduce costs for design and manufacture for that.

In the above configuration, the engagement portion may have a discontinuous space between the adjacent convex portions. According to this configuration, a tip end portion of a convex strip of the attached shape makes contact with a hard portion of the light guide plate pressing portion, so that it is possible to adjust an interval between the light guide plate and the front side pressing member to a height of the convex strip. In this way, it is possible to suppress a shift or a tilt of the front side pressing member or the light guide plate and it is possible to suppress uneven brilliance of planar light.

In the above configuration, the front side pressing member may be provided with a reflection layer disposed at least between the attached shape and the engagement portion, and the front side pressing member may also be formed with a highly reflective material.

According to this configuration, light introduced to a light emission surface of a light guide plate at an angle of a critical angle or less out of the light introduced to the light receiving surface is returned to inside the light guide plate by the reflection layer or a light guide plate pressing portion of the front side pressing member, so that it is possible to utilize these kinds of light as a part of the planar light. In this way, it is possible to enhance the rate of utilization of the light emitted from a light source.

A device using a backlight unit in the above configuration may include a liquid crystal display device including a liquid crystal panel unit in front of the backlight unit.

Advantageous Effects of Invention

According to the present invention, by providing an attached shape (in a prism shape, a lenticular shape, and the like) on a light emitting surface of a light guide plate, it is possible to increase brilliance of the planar light emitted from the light emitting surface and enhance the rate of utilization of light from the light source. In addition, it is possible to close the gap between the light guide plate and a panel chassis, so that light leakage from the gap between the light guide plate and the panel chassis is suppressed and uneven brilliance of planar light is suppressed.

BRIEF DESCRIPTION OF DRAWINGS

FIG. 3 is a line cross-sectional view of a backlight unit used for the liquid crystal display device illustrated in FIG. 2.

FIG. 4 is a cross-sectional view of another example of a backlight unit according to the present invention cut along a line same as FIG. 3.

FIG. 5 is a cross-sectional view of still another example of a backlight unit according to the present invention cut along a line same as FIG. 2.

DESCRIPTION OF EMBODIMENTS

Figure 1:
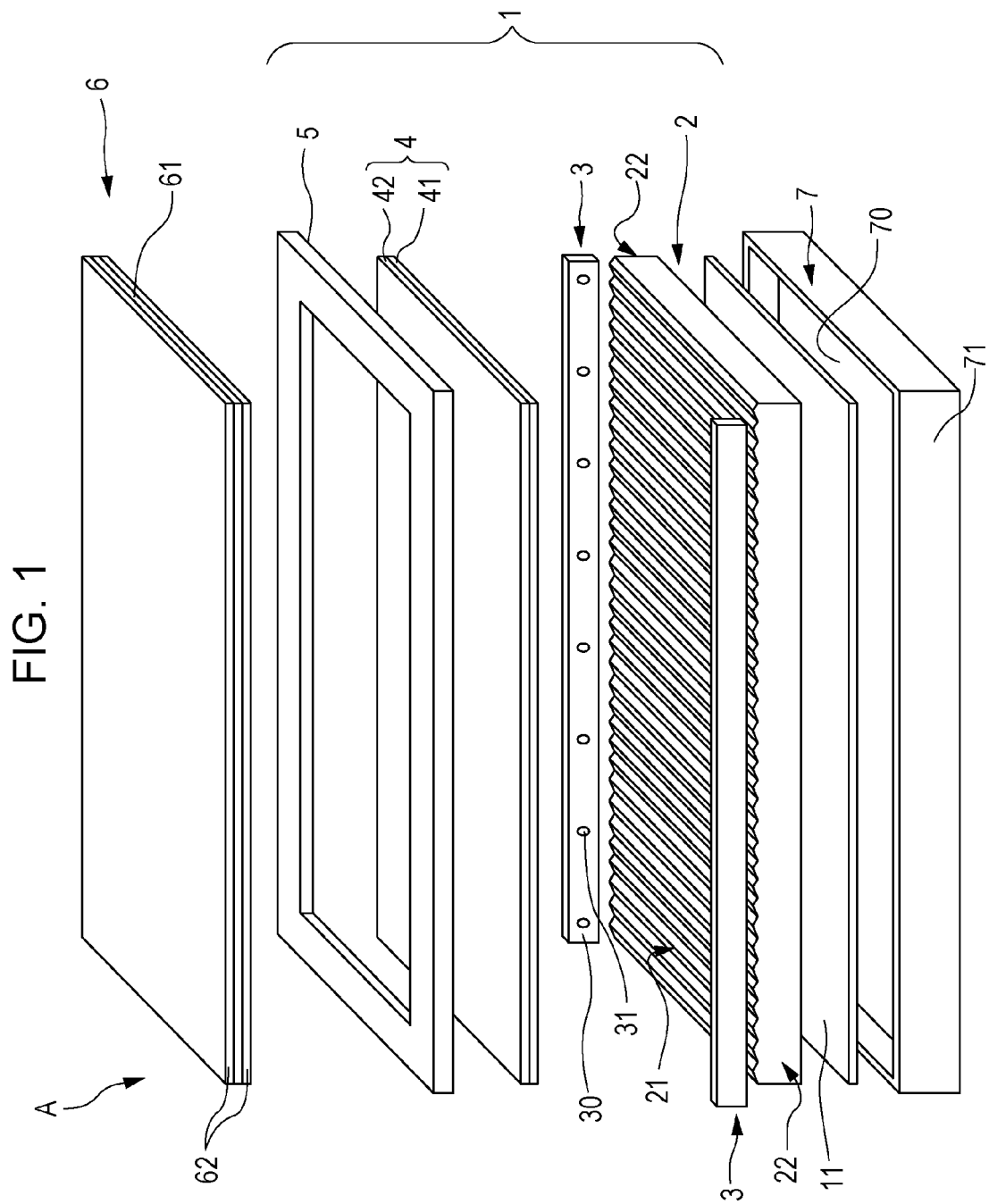
FIG. 1 is an exploded perspective view of a liquid crystal display device according to the present invention.
Figure 2:
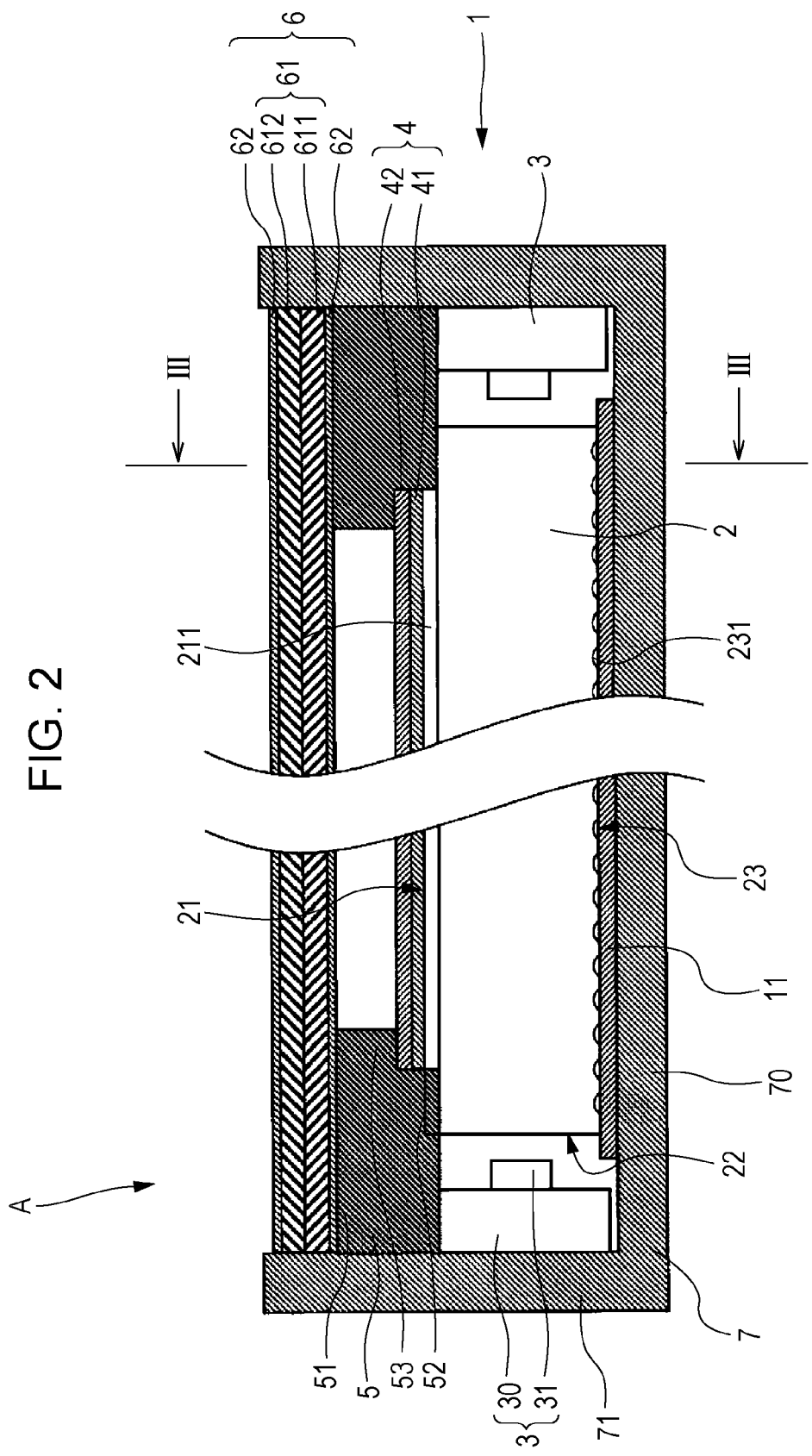
FIG. 2 is a cross-sectional view of the liquid crystal display device illustrated in FIG. 1.

Descriptions are given below to embodiments of the present invention with reference to the drawings. FIG. 1 is an exploded perspective view of a liquid crystal display device according to the present invention, and FIG. 2 is a cross-sectional view of the liquid crystal display device illustrated in FIG. 1. In a liquid crystal display device A illustrated in FIG. 1 and FIG. 2, descriptions are given that the upper side of the sheet is the front side, that is, the observer side and the lower side is the back side. In the descriptions below, unless otherwise described, descriptions are given based on the front side and the back side in the state of FIG. 1 or FIG. 2.

As illustrated in FIG. 1 and FIG. 2, the liquid crystal display device A is provided with a backlight unit 1, a liquid crystal panel unit 6, and a housing 7. In the liquid crystal display device A, the backlight unit 1 and the liquid crystal panel unit 6 are disposed inside the housing 7 in such a manner that the liquid crystal panel unit 6 is on the front side.

As illustrated in FIG. 1 and FIG. 2, the housing 7 is a member in a box shape with an open front side (liquid crystal panel unit side) and is provided with a bottom portion 70 in a rectangular shape in front view and side wall portions 71 projecting from peripheral portions of the bottom portion 70. The housing 7 may also be referred to as a frame member having the bottom portion 70.

The liquid crystal panel unit 6 is held on the back side by a front side pressing member 5, described later, of the backlight unit 1. Although omitted from the description, the front side pressing member 5 is provided with a holding portion to suppress a shift of the liquid crystal panel unit 6.

The liquid crystal panel unit 6 has a liquid crystal panel 61 with encapsulated liquid crystal and polarizing plates 62 attached to a front surface (observer side) and a back surface (backlight 1 side) of the liquid crystal panel 61. As illustrated in FIG. 2, the liquid crystal panel 61 includes an array substrate 611, a facing substrate 612 disposed facing the array substrate 611, and liquid crystal (not shown) filled between the array substrate and the facing substrate.

The array substrate 611 is equipped with source wiring and gate wiring orthogonal to each other, a switching element (for example, thin film transistor) connected to the source wiring and the gate wiring, a pixel electrode and an alignment film connected to the switching element, and the like. Then, the facing substrate 612 is equipped with a color filter having respective coloring portions of red, green, and blue (RGB) disposed in predetermined arrangement, a common electrode, an alignment film, and the like.

By driving the switching element of the array substrate 611, a voltage is applied between the array substrate 611 and the facing substrate 612 in each pixel of the liquid crystal panel 61. In the liquid crystal panel unit 6, the liquid crystal is operated by adjusting the voltage between the array substrate 611 and the facing substrate 612 to modulate the light transmitting through each pixel. In the liquid crystal display device A, utilizing the light modulation, an image is displayed in an image display area of the liquid crystal panel 61.

First Embodiment

Descriptions are given to a backlight unit, which is a principal part of the present invention, with reference to the drawings. The backlight unit 1 is a lighting device to radiate planar light having the brilliance uniformized in plane to the liquid crystal panel unit 6. As illustrated in FIG. 1 and FIG. 2, the backlight unit 1 is provided with a light guide plate 2 in a flat plate shape, light source units 3 to radiate light towards light receiving surfaces 22 formed on side surfaces of the light guide plate 2, an optical sheet 4 disposed close to the light guide plate 2, and the front side pressing member 5 to press peripheral portions of the light guide plate 2 and the optical sheet 4 from the front side. The backlight unit 1 is also provided with a reflection sheet 11 disposed between the light guide plate 2 and the bottom portion 70 of the housing 7 so as to make contact with both. The reflection sheet 11 plays a role of reflecting light emitted from a reflection surface 23 to return it from the reflection surface 23 to the light guide plate 2.

When the bottom portion 70 is configured to allow sufficient light reflection, the reflection sheet 11 may be omitted. Although the optical sheet 4 is pressed with the front side pressing member 5 in the backlight unit A, the configuration may be to press the light guide plate 2 only. The optical sheet 4 does not necessarily have to make contact with the light guide plate 2 and the position is not limited as long as being between the light guide plate 2 and the liquid crystal panel unit 6.

The light guide plate 2 is a member to guide the light emitted from the light source units 3 to the liquid crystal panel unit 6, and a transparent resin, such as polymethylmethacrylate (PMMA) and polycarbonate, molded in a flat plate shape is used. It is not limited to these resins, and it is possible to widely employ those having transparency or translucency and capable of being formed in a flat plate shape.

As illustrated in FIG. 1, when disposed inside the housing 7, the light guide plate 2 is configured to have a main surface facing the liquid crystal panel unit 6 as a light emitting surface 21, both side surfaces in short-end directions as the light receiving surfaces 22 to receive light from the light source units 3, and a main surface on a side opposite to the light emitting surface 21 as the reflection surface 23. The light guide plate 2 is provided with a rising portion 231 on the reflection surface 23. The rising portion 231 diffusely reflects the light entered from the light receiving surfaces 22 towards the light emitting surface 21, thereby emitting uniformized planar light.

Next, more detailed descriptions are given to the light guide plate 2 with reference to the drawings. FIG. 3 is a line cross-sectional view of a backlight unit used for the liquid crystal display device illustrated in FIG. 2. As illustrated in FIG. 3, the rising portion 231 is in a lens shape, and phosphor is applied on a surface of the rising portion 231. When the light introduced from the light receiving surfaces 21 hits the rising portion 231 of the reflection surface 23, it diffusely reflects towards the light emitting surface 21 and is also excited by the phosphor for wavelength conversion.

In the light guide plate 2, in order to allow uniformization of brilliance distribution of the light emitted from the light emitting surface 21, the shape and (or) coverage (area ratio of the rising portion 231 to the reflection surface 23) of the rising portion 231 is adjusted. The rising portion 231 is in a dot shape (point like), and has a diameter and a thickness both from 100 μm to 500 μm. Although the one processed in a lens shape is employed for the rising portion 231, it is not limited to this and it is possible to widely employ those capable of directing the direction of travel of light to the light emitting surface 21, such as printing on the reflection surface 23 with a high refraction ink.

On the light emitting surface 21 of the light guide plate 2, an attached shape 211 in a concave and convex shape is formed. The attached shape 211 has a shape of alternately arranging, in a longitudinal direction, convex strips and concave grooves in a cross-sectional triangular shape extending in short-end directions of the light emitting surface 21, and each convex strip acts as a triangular prism. The concave grooves are grooves in a V-shape. The concave grooves are not limited to the grooves in a V-shape, and they may be in a cross-sectional trapezoidal shape and root portions may also be formed in a curved surface shape.

The light passing through the attached shape 211 is collected in the front direction. Effects of the attached shape 211 are described in detail as follows. The light raised towards the light emitting surface 21 in the rising portion 231 passes through the attached shape 211. The light raised in the rising portion 231 varies in direction of travel, and when passing through the attached shape 211, is collected in the front direction (direction towards the liquid crystal panel unit 6 in the liquid crystal display device A). This arranges the directions of travel of light emitted from the emitting surface 21 in order and the brilliance of the planar light emitted from the light emitting surface 21 becomes high. Since the attached shape 211 is formed on the light emitting surface 21 of the light guide plate 2, it is possible to omit a prism sheet (lens sheet) conventionally included in the optical sheet 4 and it is possible to reduce manufacturing costs for that.

The light source units 3 is provided with array substrates 30 in an elongated shape disposed facing the light receiving surfaces 22 and a plurality of LEDs 31 arranged linearly on the array substrates 30. Although the LEDs 31 are arranged at equal intervals in the light source units 3, the arrangement may also be at varied intervals partially. As illustrated in FIG. 2, the array substrates 30 are fixed to the side wall portions 71 of the housing 7. At this time, the LEDs 31 face inside the backlight 1, that is, the light receiving surfaces 22 of the light guide plate 2. This causes the light emitted from the LEDs 31 to be introduced to the light receiving surfaces 22.

The optical sheet 4 is a member in which optical sheet members in a rectangular shape smaller than the light emitting surface 21 of the light guide plate 2 are stacked. As the optical sheet members, a diffusion sheet 41 to diffuse the light emitted from the light emitting surface 21 of the light guide plate 2 and a light polarization reflection sheet (DBEF) 42 to improve the brilliance are provided. There is also a case of using optical sheet members having optical properties other than them.

The front side pressing member 5 is a member to be mounted on the front side of the light guide plate 2 of the backlight unit 1 and has a shape fitting inside the housing 7. The front side pressing member 5 is provided with a panel holding portion 51 formed on the upper surface to hold the liquid crystal panel unit 6, a light guide plate pressing portion 52 formed on the lower surface to press the peripheral portions of the light emitting surface 21 of the light guide plate 2, and a sheet pressing portion 53 to press the peripheral portions on the front side of the optical sheet 4. The front side pressing member 5 is detachable to the housing 7 and also fixable to the housing 7 with a fixing portion omitted from the illustration. This fixing portion may also be integrated with the housing 7.

More detailed descriptions are given to the front side pressing member 5. The front side pressing member 5 has an opening in the center portion on the front, and the planar light emitted from the light emitting surface 21 of the light guide plate 2 is transmitted from this opening. Therefore, in addition to the functions to hold the liquid crystal panel unit 6 and to press the light guide plate 2, the light source units 3, and the optical sheet 4, the front side pressing member 5 also has a function as an optical mask to restrict a radiation region of the planar light.

As illustrated in FIG. 3, the attached shape 211 is formed on the light emitting surface 21 of the light guide plate 2, so that gaps are formed between concave portions in the attached shape 211 and the front side pressing member 5 when a panel holder in a conventional shape is disposed to make contact with the light emitting surface 21 of the light guide plate 2. There is a case that the light emitted from the LEDs 31 leaks from the gaps.

With that, in the backlight unit 1 according to the present invention, in order to suppress light leakage from the gaps between the attached shape 211 and the front side pressing member 5, an engagement portion 521 to engage with the attached shape 211 is formed on the light guide plate pressing portion 52 of the front side pressing member 5. The engagement portion 521 is provided with concave portions to engage with the convex strips of the attached shape 211 and convex portions to engage with the concave grooves of the attached shape 211.

As illustrated in FIG. 3, a side of the surface of the front side pressing member 5 facing the light guide plate 2 is formed stepwise, and the step portion becomes the sheet pressing portion 53 to press the optical sheet 4. Therefore, the sheet pressing portion 53 is a step having a depth same or approximately same as the thickness of the optical sheet 4.

In the backlight unit 1, the light guide plate 2 having the optical sheet 4 disposed to make contact with the light emitting surface 21 is disposed inside the housing 7, and the front side pressing member 5 is mounted from the front side. This causes the engagement portion 521 of the light guide plate pressing portion 52 to securely engage with the attached shape 211 of the light emitting surface 21 of the light guide plate 2 and the sheet pressing portion 53 to make tight contact with the optical sheet 4.

By utilizing the front side pressing member 5 in such configuration, the light emitting surface 21 of the light guide plate 2 is tightly attached to the light guide plate pressing portion 52 of the front side pressing member 5 and it is possible to suppress formation of the gaps between the light guide plate 2 and the front side pressing member 5. Then, it suppresses leakage of the light emitted from the LEDs 31 of the light source units 3 from the gaps between the light guide plate 2 and the front side pressing member 5 and suppresses radiation of the light emitted from the LEDs 31 to outside the backlight unit 1.

In this way, it is possible to suppress uneven brilliance of the planar light radiated from the backlight unit 1 to the liquid crystal panel unit 6. In addition, since leakage light does not easily occur, it is possible to enhance the utilization efficiency of the light emitted from the LEDs 31.

Although the engagement portion 521 is formed on the light guide plate pressing portion 52 to press a region next to the light receiving surfaces 22 of the light emitting surface 21 in the front side pressing portion 5 shown in the present embodiment, it is not limited to that. That is to say, as long as the engagement portion 521 is formed on the light guide plate pressing portion 52 to press a region of the light emitting surface 21 at least next to the light receiving surfaces 22, the light guide plate pressing portion 52 other than that may be in a flat plane shape, and similar to the engagement portion 521, a shape engaging with the attached shape 211 may also be formed. In each embodiment below, this is similar unless otherwise specified.

Second Embodiment

Descriptions are given to another example of a backlight unit according to the present invention with reference to the drawings. FIG. 4 is a cross-sectional view of another example of a backlight unit according to the present invention cut along a line same as FIG. 3. A backlight unit 1B illustrated in FIG. 4 has a configuration same as the backlight unit 1 other than having different light guide plate 2b and front side pressing member 5b, and a same reference character is given to substantially same parts. In addition, detailed descriptions on the substantially same parts are omitted.

On a light emitting surface 21b of the light guide plate 2b, an attached shape 212 is formed. As illustrated in FIG. 4, the attached shape 212 is in a lenticular shape. Then, on a light guide plate pressing portion 52b of the front side pressing member 5b, an engagement portion 522 in a shape of arranging concave curve surfaces in line (here, referred to as a reverse lenticular shape) is formed to fit the attached shape 212 in a lenticular shape.

In such a manner, by providing the front side pressing member 5b provided with the engagement portion 522 in a reverse lenticular shape, it is possible to suppress occurrence of gaps between the light guide plate 2b and the front side pressing member 5b. In this way, it is possible to suppress leakage of the light, emitted from the LEDs 31, from the gaps between the light guide plate 2b and the front side pressing member 5b.

Third Embodiment

Descriptions are given to still another example of a backlight unit according to the present invention with reference to the drawings. FIG. 5 is a cross-sectional view of still another example of a backlight unit according to the present invention cut along a line same as FIG. 2. A backlight unit 10 illustrated in FIG. 5 has a configuration same as the backlight unit 1 other than having a different front side pressing member 5c, and a same reference character is given to substantially same parts. In addition, detailed descriptions on the substantially same parts are omitted. In the backlight unit 10, a liquid crystal panel unit is omitted from the illustration.

Usually in a backlight unit, a front side pressing member is often formed in black that absorbs light in order to absorb the leakage light described above and to suppress uneven brilliance of the planar light. Since the backlight unit 10 according to the present invention is configured not to form gaps between the light guide plate 2 and the front side pressing member 5c, leakage light also does not occur. Out of the light introduced from the light receiving surfaces 22 to inside the light guide plate 2 and also the light travelling towards the light emitting surface 21, light towards areas close to the light receiving surfaces 22 has a smaller angle of incidence to the light emitting surface 21 and is emitted from the light emitting surface 21 to outside.

Since the LEDs 31 are point light sources, in areas close to the light receiving surfaces 22 of the light emitting surface 21, there is a case that an angle of light incidence to the light emitting surface 21 becomes smaller than a critical angle to emit from the light emitting surface 21. The light introduced from the light receiving surfaces 22 is not diffused sufficiently inside the light guide plate 2 and light having high luminous flux density, that is, highly brilliant turns out to be emitted. In the backlight unit 10, such highly brilliant light emitted from areas close to the light receiving surfaces of the light emitting surface 21 is returned to inside the light guide plate 2, thereby enhancing the rate of light utilization.

Since the rate of light utilization is enhanced in such a manner, the front side pressing member 5c is formed with a highly reflective (here, white) resin. In the areas close to the light receiving surfaces 22 of the light emitting surface 21, this causes the light once emitted from the light emitting surface 21 to be reflected on the engagement portion 521 of the front side pressing member 5c. Then, the engagement portion 521 of the front side pressing member 5c makes contact with the light emitting surface 21, so that the reflected light returns from the light emitting surface 21 to inside the light guide plate 2. The returned light, together with the light introduced from the light receiving surfaces 22, is utilized as light to form the planar light. From the reasons above, in the backlight unit 1C, it is possible to reduce waste of light emitted from the LEDs 31 (to enhance the rate of light utilization).

More detailed descriptions are given to the front side pressing member 5c. A light guide plate pressing portion 52c of the front side pressing member 5c is formed to cover a region in a length L from an end portion of the light guide plate 2, that is, formed in the length L from the end portion of the light guide plate pressing portion 52c. In portions, of the light emitting surface 21, engaged with the light guide plate pressing portion 52c, the light emitted from the light emitting surface 21 is reflected on the light guide plate pressing portion 52c of the front side pressing member 5c and returns to the light guide plate 2. From this, the length L of the light guide plate pressing portion 52c may be the length from the tip end on the light receiving surfaces 22 side to a tip end of the region in which the incident angle of light directly introduced to the light emitting surface 21, out of the light introduced inside the light guide plate 2 from the light receiving surfaces 22, becomes a critical angle or less. By being configured in such a manner, it also has effects of suppressing emission of light having high luminous flux density from near the light entrance surface 22 and efficiently suppressing occurrence of uneven brilliance of the planar light.

Although the front side pressing member 5c is exemplified as the one formed with a white resin that is high in reflectance of light, it is not limited to this and it is possible to widely employ those formed with a material high in reflectance of light. In the front side pressing member 5c, as long as the reflectance of the light guide plate pressing portion 52c is high, other portions may be low in reflectance.

Although the light guide plate 2 used for the backlight unit 1, that is, the light guide plate 2 having the attached shape 211 in a triangular prism shape on the light emitting surface 21 is employed in the backlight unit 1C illustrated in the present embodiment, it may also be the light guide plate 2b used for the backlight unit 1B. In this case, as the front side pressing member 5c, one provided with the engagement portion 522 in a reverse lenticular shape is used.

Fourth Embodiment

Figure 6:
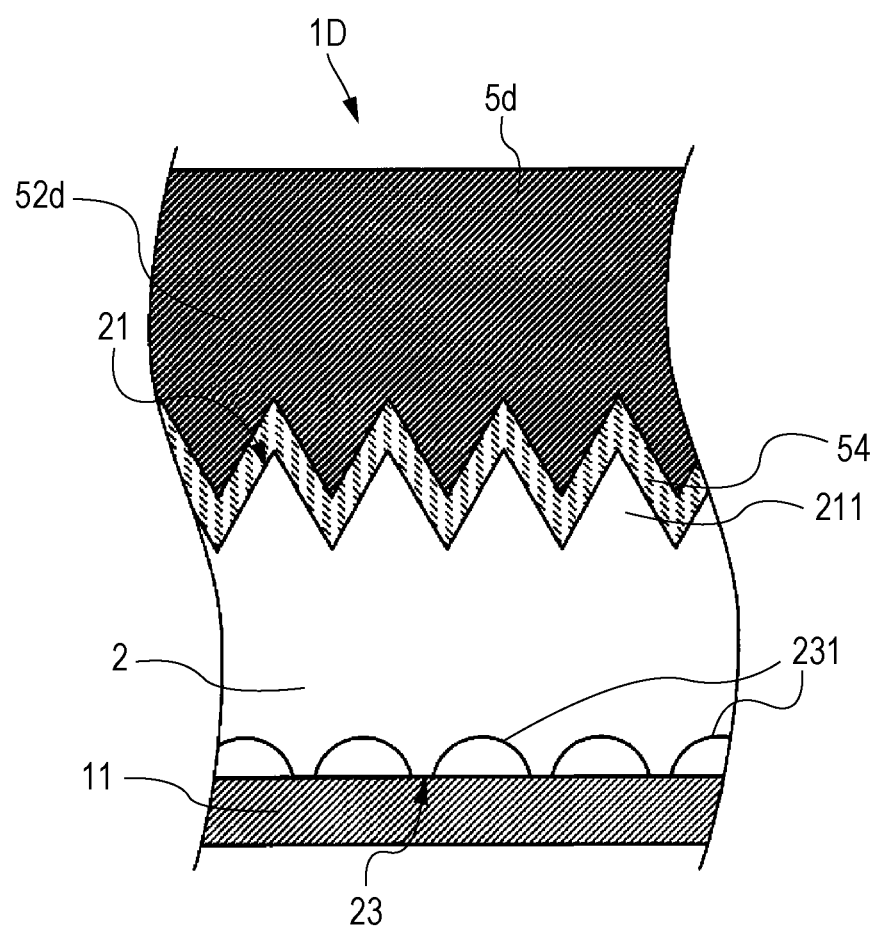
FIG. 6 is a cross-sectional view of yet another example of a backlight unit according to the invention cut along a line same as FIG. 3.

Descriptions are given to yet another example of a backlight unit according to the present invention with reference to the drawings. FIG. 6 is a cross-sectional view of yet another example of a backlight unit according to the present invention cut along a line same as FIG. 3. A backlight unit 1D illustrated in FIG. 6 has a configuration same as the backlight unit A other than having a different front side pressing member 5d, and a same reference character is given to substantially same parts. In addition, detailed descriptions on the substantially same parts are omitted.

As illustrated in FIG. 6, between the light emitting surface 21 of the light guide plate 2 and a light guide plate pressing portion 52d of the front side pressing member 5d, a reflection layer 54 that is high in reflectance is formed. By being provided with the reflection layer 54, it is possible to enhance the rate of light utilization even using the front side pressing member 5d formed in a same color as a conventional front side pressing member that absorbs light. It is also possible to use a material same as those currently used for manufacture of the front side pressing member 5d and it is possible to reduce the efforts of design and manufacture.

The reflection layer 54 may also be those formed by printing, film formation, or the like on a surface of the light guide plate pressing portion 52d and (or) a surface of the light emitting surface 21 of the light guide plate 2, and it may also dispose a film to reflect light and sandwich the film with the light guide plate 2 and the front side pressing member 5d.

Although the light guide plate 2 used for the backlight unit A, that is, the light guide plate 2 having the attached shape 211 in a triangular prism shape on the light emitting surface 21 is employed in the backlight unit 1D illustrated in the present embodiment, it may also be the light guide plate 2b used for the backlight unit 13. In this case, as the front side pressing member 5d, one provided with the engagement portion 522 in a reverse lenticular shape is used.

Fifth Embodiment

Figure 7:
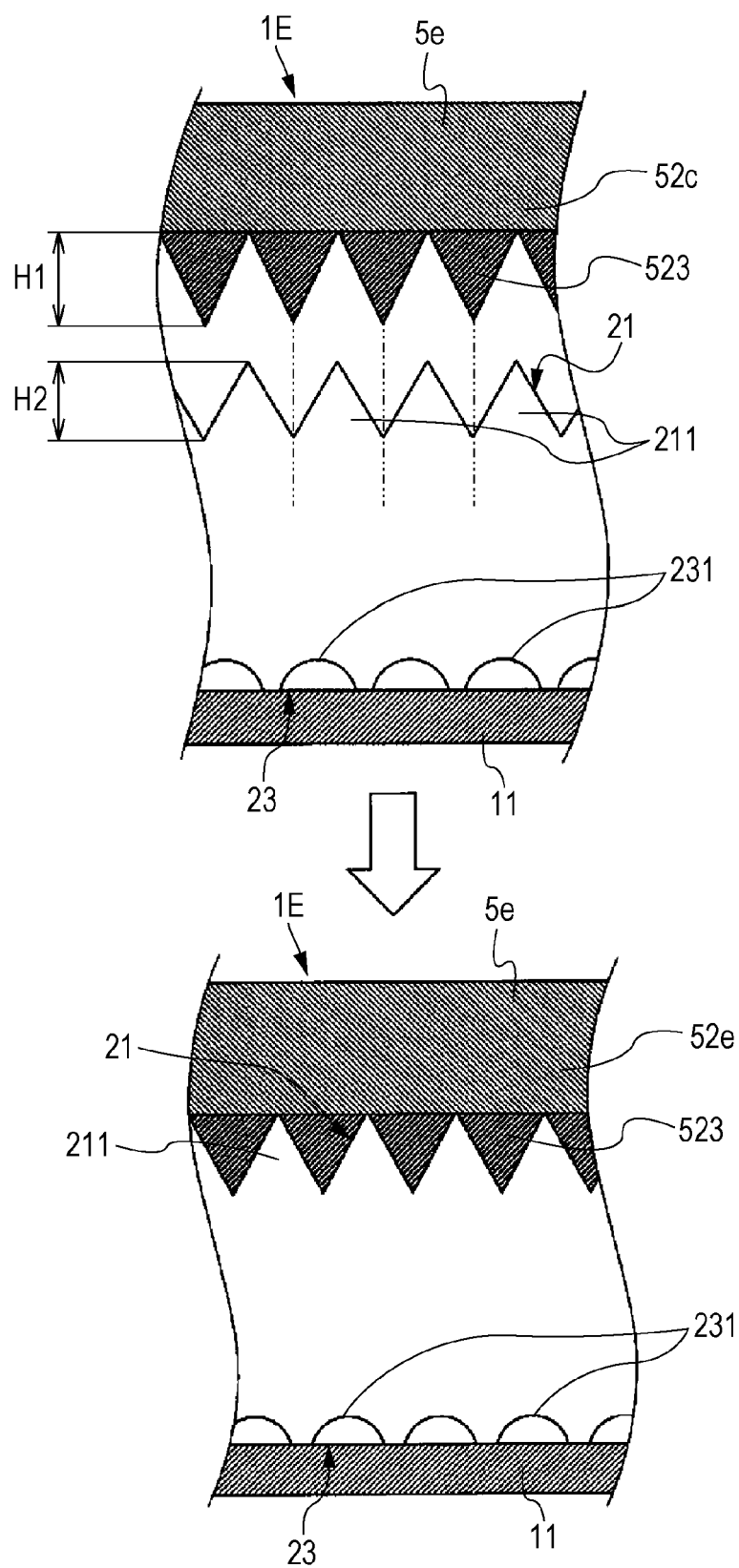
FIG. 7 is an enlarged cross-sectional view illustrating assembly of a front side pressing member with a light guide plate used for yet another example of a backlight unit according to the present invention.

Descriptions are given to yet another example of a backlight unit according to the present invention with reference to the drawings. FIG. 7 is an enlarged cross-sectional view illustrating assembly of a front side pressing member with a light guide plate used for yet another example of a backlight unit according to the present invention. A backlight unit 1E illustrated in FIG. 7 has a configuration same as the backlight unit A other than having a different front side pressing member 5e, and a same reference character is given to substantially same parts. In addition, detailed descriptions on the substantially same parts are omitted.

As illustrated in FIG. 7, in a light guide plate pressing portion 52e of the front side pressing member 5e, convex strips 523 in a cross-sectional triangular shape are disposed side by side. The convex strips 523 are formed with a resin capable of elastic deformation, such as urethane. A height H1 of the convex strips 523 is formed to be greater than a depth H2 of concave grooves in the attached shape 211 of the light emitting surface 21 of the light guide plate 2. Further, gaps are formed in portions between the adjacent convex strips 523 in such a manner that not easily deformed portions (in other words, hard portions) of the front side pressing member 5e make contact with the convex strips of the attached shape 211. Then, the convex strips 523 are disposed in a pitch same as the pitch of the concave grooves of the attached shape 211.

By being provided with such light guide plate pressing portion 52e, when the light guide plate 2 is pressed by the front side pressing member 5e on the peripheral portions of the light emitting surface 21, the tip end of the convex strips 523 with a higher height firstly reaches inside the concave grooves of the attached shape 211. Then, by further pressing the front side pressing member 5e towards the light guide plate 2, the convex strips 523 are deformed and fully fill up the concave grooves of the attached shape 211. In this way, it is possible to suppress occurrence of gaps between the light guide plate 2 and the front side pressing member 5e. At this time, the convex strips of the attached shape 211 make contact with the not easily deformed portions of the light guide plate pressing portion 52e, so that it is possible to keep the gaps between the light guide plate 2 and the front side pressing member 5e constant or approximately constant.

In such a manner, by using the front side pressing member 5e, for example, even when variation in manufacture of the concave grooves of the attached shape 211 occurs, it is possible to effectively suppress occurrence of gaps. As described above, it is possible to suppress change in the gaps between the light guide plate 2 and the front side pressing member 5e, so that it is possible to suppress a decrease in the quality of planar light emitted from the backlight unit 1E.

Figure 8:
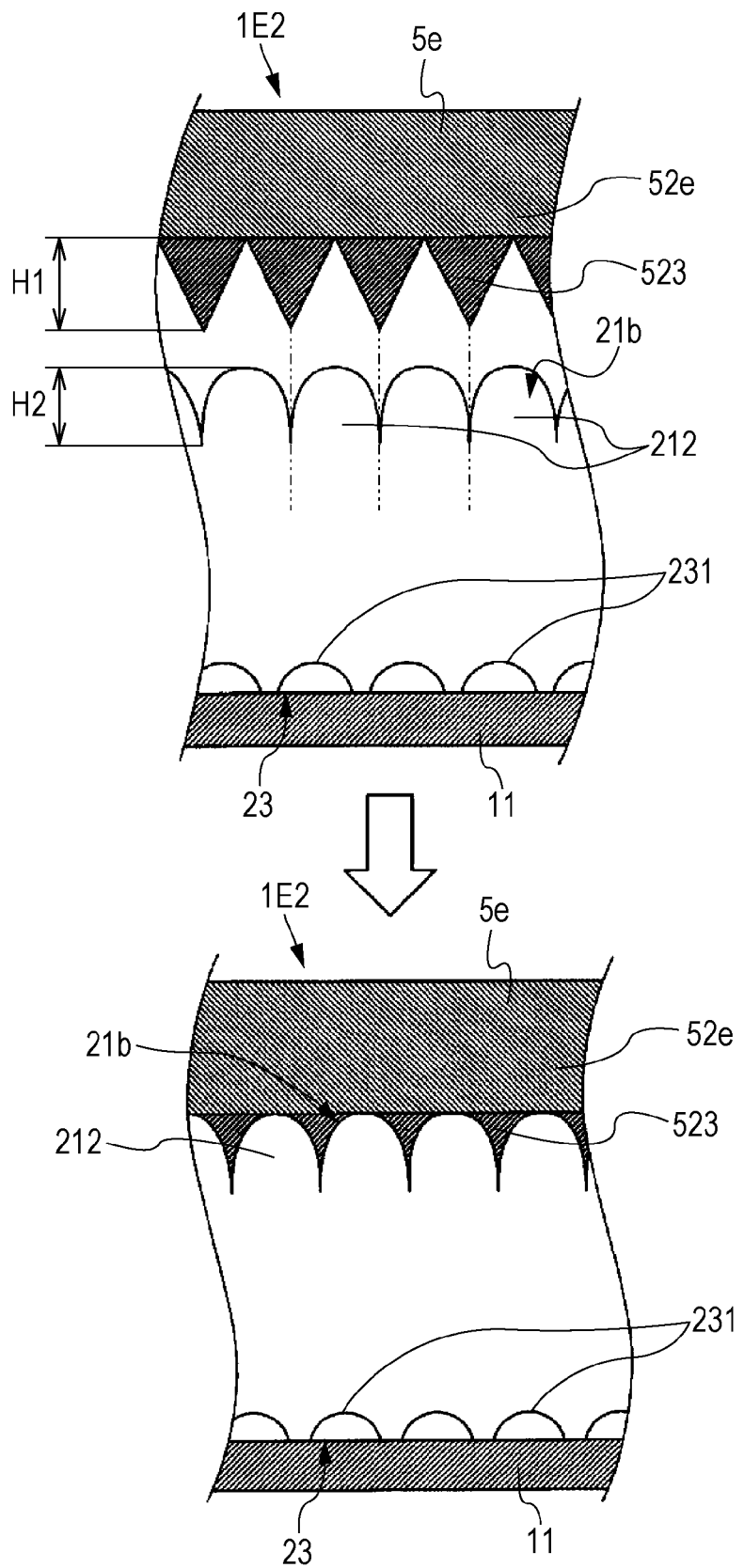
FIG. 8 is a cross-sectional view illustrating a modification of the backlight unit illustrated in FIG. 7.
Figure 9:
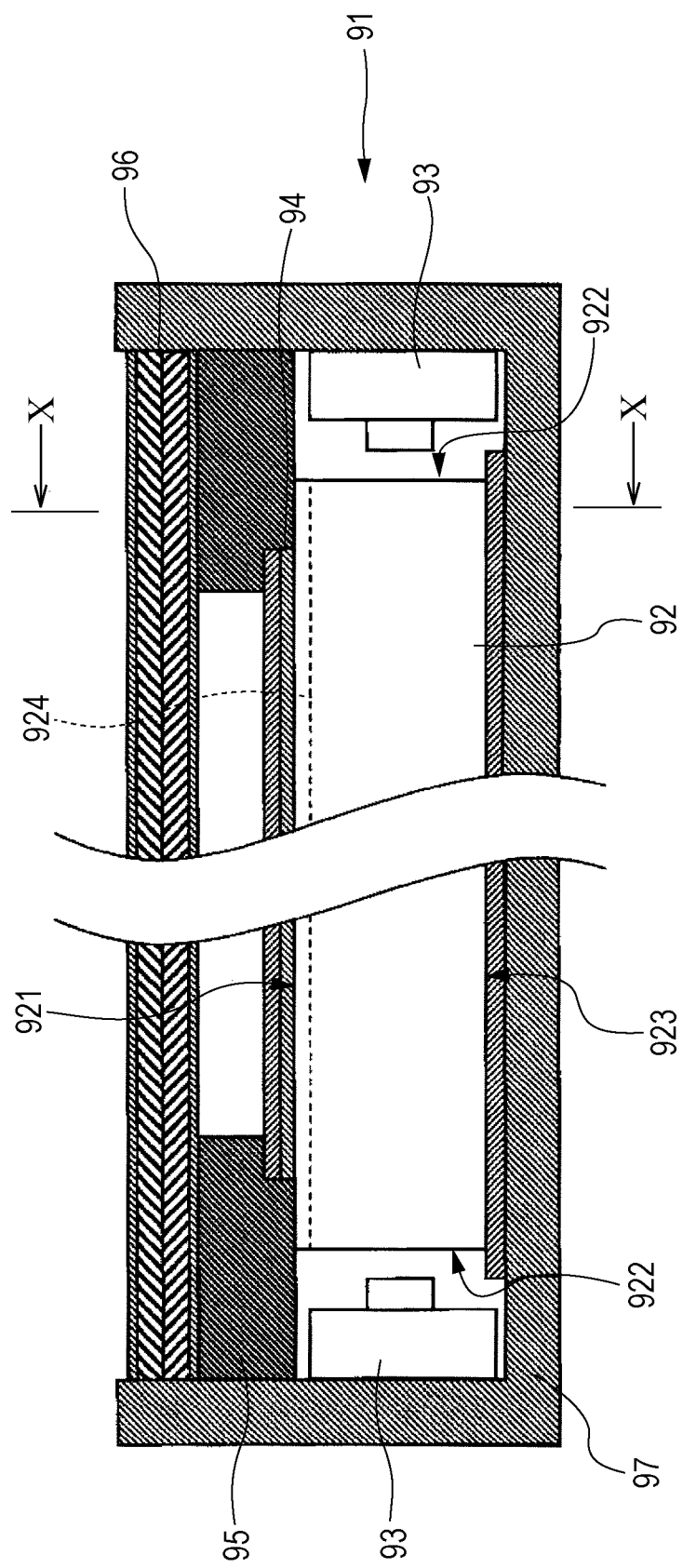
FIG. 9 is a cross-sectional view of a liquid crystal display device using a backlight unit of a conventional edge light system.
Figure 10:
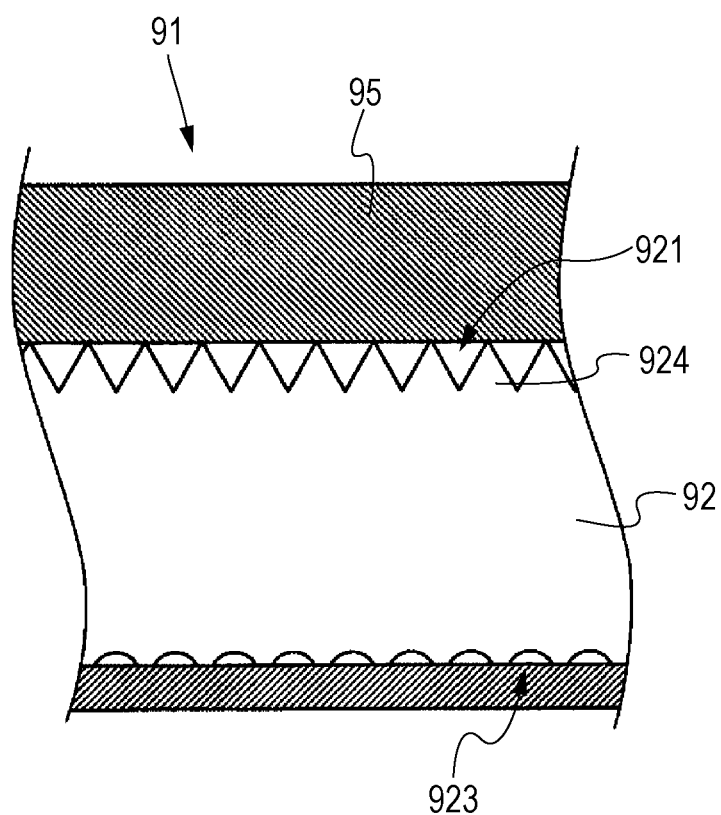
FIG. 10 is an X-X line cross-sectional view of the backlight unit illustrated in FIG. 9.

Descriptions are given to a modification of in the present embodiment with reference to the drawings. FIG. 8 is a cross-sectional view illustrating a modification of a backlight unit illustrated in FIG. 7. A backlight unit 11E2 illustrated in FIG. 8 is same as the backlight unit 1E other than employing the light guide plate 2b provided with the attached shape 212 in a lenticular shape for the light emitting surface 21b, and a same reference character is given to substantially same parts. In addition, detailed descriptions on the substantially same parts are omitted.

As illustrated in FIG. 8, a tip end of the convex strips 523 of the front side pressing member 5e is inserted into groove portions between adjacent convex surfaces of the attached shape 212. Then, by pressing the front side pressing member 5e against the light guide plate 2b, the convex strips 523 are deformed to be tightly attached to the lenticular shape. This suppresses formation of gaps between the light guide plate 2b and the front side pressing member 5e, so that leakage light does not easily occur. Then, by suppressing occurrence of the leakage light, the backlight unit 1E2 is capable of suppressing uneven brilliance of the planar light and enhancing the rate of light utilization.

The front side pressing member 5e is capable of handling the light guide plate 2 having the attached shape 211 in a prism shape and also the light guide plate 2b having the attached shape 212 in a lenticular shape. It is also capable of flexibly handling a shape of the attached shape other than the prism shape or the lenticular shape.

Although the attached shape in a triangular prism shape or in a lenticular shape is formed on the light emitting surface in the backlight unit shown in each embodiment described above, it is not limited to them and it is possible to widely employ a shape that is capable of efficiently collecting light directly to the light emitting surface or light raised in the rising portion of the reflection surface in the front direction.

Although the attached shape is configured to be provided with convex strips or concave grooves in each embodiment described above, it is not limited to this and may also have, for example, convex portions in a quadrangular pyramid shape in two-dimensional arrangement.

Although the descriptions have been given above to embodiments of the present invention, the present invention is not limited to the contents. In addition, embodiments of the present invention may be variously modified without departing from the spirit of the invention.

INDUSTRIAL APPLICABILITY

It is possible to utilize a backlight unit and a liquid crystal display device provided with the backlight according to the present invention as a display unit of a mobile phone, a mobile information terminal, a tablet PC, a navigation device, and a game machine, and a display unit of a home electrical appliance.

REFERENCE SIGNS LIST 1 backlight unit
2 light guide plate
21 light emitting surface
211 attached shape
22 light receiving surface
23 reflection surface
231 rising portion
3 light source unit
30 array substrate
31 LED (light source)
4 optical sheet
41 diffusion sheet
42 light polarization reflection sheet (DBEF)
5 front side pressing member
51 panel holding portion
52 light guide plate pressing portion
53 sheet pressing portion
6 liquid crystal panel unit
61 liquid crystal panel
611 array substrate
612 facing substrate
62 polarizing plate
7 housing

The invention claimed is:

1. A backlight unit comprising:
a light guide plate receiving light from a light source from a light receiving surface on a side surface and emitting planar light from a light emitting surface on a front side; and
a front side pressing member having a light guide plate pressing portion to press a peripheral portion on the front side of the light guide plate; wherein
an attached shape in a concave and convex pattern shape is formed in the light emitting surface of the light guide plate, and
the light guide plate pressing portion is provided with an engagement portion provided with a concave and convex pattern that is engageable with the attached shape.

2. The backlight unit according to claim 1, wherein
the attached shape has a shape in which a convex strip and a concave groove extending in a direction crossing the light receiving surface are arranged alternately in a direction along the light receiving surface, and
the light guide plate pressing portion is provided with the engagement portion at least in a portion making contact with a region next to the light receiving surface of the light emitting surface.

3. The backlight unit according to claim 2, wherein the convex strip of the attached shape is in a triangular prism shape.

4. The backlight unit according to claim 2, wherein the attached shape is in a lenticular shape.

5. The backlight unit according to claim 2, wherein the engagement portion has a convex portion that engages with the concave groove of the attached shape projecting from the light guide plate pressing portion, and the convex portion is capable of elastic deformation.

6. The backlight unit according to claim 5, wherein the engagement portion has a discontinuous space between the adjacent convex portions.

7. The backlight unit according to claim 1, wherein the front side pressing member is provided with a reflection layer disposed at least between the attached shape and the engagement portion.

8. The backlight unit according to claim 1, wherein the front side pressing member is formed with a highly reflective material.

9. A liquid crystal display device comprising:
the backlight unit according to claim 1; and
a liquid crystal panel unit in front of the backlight unit.

* * * * *